US008630946B2

(12) United States Patent
Moore et al.

(10) Patent No.: US 8,630,946 B2
(45) Date of Patent: Jan. 14, 2014

(54) SYSTEMS AND METHODS FOR PROVIDING INDIVIDUALIZED FINANCIAL ACCESS

(75) Inventors: Gary F. Moore, Mill Valley, CA (US); David T. Shapiro, Highlands Ranch, CO (US); Robert W. Newton, San Francisco, CA (US)

(73) Assignee: The Western Union Company, Englewood, CO (US)

( * ) Notice: Subject to any disclaimer, the term of this patent is extended or adjusted under 35 U.S.C. 154(b) by 1672 days.

(21) Appl. No.: 10/295,769

(22) Filed: Nov. 14, 2002

(65) Prior Publication Data

US 2004/0088261 A1   May 6, 2004

Related U.S. Application Data

(60) Provisional application No. 60/423,707, filed on Nov. 4, 2002, provisional application No. 60/423,706, filed on Nov. 4, 2002, provisional application No. 60/423,708, filed on Nov. 4, 2002, provisional application No. 60/423,698, filed on Nov. 4, 2002.

(51) Int. Cl.
*G06Q 20/00* (2012.01)

(52) U.S. Cl.
USPC ............................................ 705/40; 705/42

(58) Field of Classification Search
USPC ........................................ 705/40, 30, 39, 42
See application file for complete search history.

(56) References Cited

U.S. PATENT DOCUMENTS

| 5,220,501 | A | * | 6/1993 | Lawlor et al. | 705/40 |
|---|---|---|---|---|---|
| 5,557,518 | A | * | 9/1996 | Rosen | 705/69 |
| 5,878,404 | A | | 3/1999 | Stout, Jr. et al. | |
| 5,903,881 | A | * | 5/1999 | Schrader et al. | 705/42 |
| 5,911,136 | A | | 6/1999 | Atkins | |
| 5,920,848 | A | * | 7/1999 | Schutzer et al. | 705/42 |
| 5,966,700 | A | | 10/1999 | Gould et al. | |
| 6,012,048 | A | * | 1/2000 | Gustin et al. | 705/39 |
| 6,021,202 | A | * | 2/2000 | Anderson et al. | 705/54 |
| 6,088,429 | A | | 7/2000 | Garcia | |
| 6,149,055 | A | * | 11/2000 | Gatto | 235/379 |
| 6,202,054 | B1 | * | 3/2001 | Lawlor et al. | 705/42 |
| 6,347,306 | B1 | * | 2/2002 | Swart | 705/32 |
| 6,385,595 | B1 | * | 5/2002 | Kolling et al. | 705/40 |
| 6,408,284 | B1 | * | 6/2002 | Hilt et al. | 705/40 |
| 6,629,081 | B1 | * | 9/2003 | Cornelius et al. | 705/30 |
| 6,856,970 | B1 | * | 2/2005 | Campbell et al. | 705/35 |

(Continued)

OTHER PUBLICATIONS

Microsoft Press Computer Dictionary, Third Edition, 1997 Microsoft Corporation, p. 220.*

*Primary Examiner* — Evens J Augustin
(74) *Attorney, Agent, or Firm* — Kilpatrick Townsend & Stockton LLP

(57) ABSTRACT

Systems and methods for implementing one or a series of value transfers. In some instances, the systems and methods include web or Internet based user interfaces that provide a mechanism whereby a user can implement a transfer plan without interacting with a human operator. Further, in some instances, such systems and methods provide a mechanism for authorizing access to one or more asset accounts from which value is transferred, and/or recipient accounts to which value is transferred. In some cases, the authorization function is performed by an entity that enjoys a pre-existing relationship with a user accessing the systems of the present invention, while any actual transfers are performed by a third party entity. This can be an advantage where authorization requires a signature or other interaction with a user sufficient to conform to electronic signature laws.

20 Claims, 12 Drawing Sheets

(56) References Cited

U.S. PATENT DOCUMENTS

| | | |
|---|---|---|
| 7,050,997 B1 | 5/2006 | Wood, Jr. |
| 7,089,503 B1 | 8/2006 | Bloomquist et al. |
| 7,177,836 B1 * | 2/2007 | German et al. ............... 705/40 |
| 2001/0001321 A1 * | 5/2001 | Resnick et al. ............... 705/17 |
| 2001/0044772 A1 | 11/2001 | Allen et al. |
| 2002/0042773 A1 * | 4/2002 | Fugitte et al. ............... 705/39 |
| 2002/0087461 A1 * | 7/2002 | Ganesan et al. ............... 705/39 |
| 2002/0161707 A1 * | 10/2002 | Cole et al. ............... 705/42 |
| 2003/0033245 A1 * | 2/2003 | Kahr ............... 705/39 |
| 2004/0019545 A9 * | 1/2004 | Polk ............... 705/35 |

* cited by examiner

Pay your bills online!

To make a payment, please enter the following information.

First Name — 410          Address — 450
Last Name — 420           City — 460
Account Number — 430      State — 470  [AK ▼]
                          Zip — 480
Payment Amount — 440      Payment Dates — 491  492  493   More? — 494

Pay your bills online!

Account Information

BOB JONES
123 ANY STREET
ANYTOWN, CO 123456

Account No: 123456789
Check Date: 09/24/2002

Pay to the order of: Financials

Check Type: Personal Check

| | |
|---|---|
| Payment Amount: | $ 500.00 |
| Fee: | $ 2.00 |
| Total Amount: | $ 502.00 |

ABA #
|: 102000076

Bank Account #
|: 00000000000001

Check #
||' 0001

610

● Continue

Current Amount Due
The amount that you need to pay to bring your account current or the amount of your next payment due if you are current.

Service Fee
To cover the cost of this service, we add a $2.00 service fee.

SYSTEMS AND METHODS FOR PROVIDING INDIVIDUALIZED FINANCIAL ACCESS

CROSS-REFERENCES TO RELATED APPLICATIONS

The present application claims priority to various U.S. Provisional Applications, including: U.S. Provisional Application No. 60/423,707 filed Nov. 4, 2002, entitled "Systems and Methods for Providing Individualized Financial Access"; U.S. Provisional Patent Application No. 60/423,706, entitled "Systems and Methods for Directing Recurring Financial Transfer Operations", filed Nov. 4, 2002; U.S. Provisional Patent Application No. 60/423,708, entitled "Systems and Methods for Customizing Mortgage Characteristics", filed Nov. 4, 2002; and U.S. Provisional Patent Application No. 60/423,698, entitled "Systems and Methods for Authorizing Account Access", filed Nov. 4, 2002. Each of the aforementioned patent applications are incorporated herein by reference for all purposes and filed on a date even herewith.

BACKGROUND OF THE INVENTION

The present invention relates generally to the field of account customization, and in particular to systems and methods for tailoring account characteristics to the needs of an individual consumer.

Various types of financial products are offered to consumers. Such financial products typically are designed to meet the needs of a broad cross-section of a given market. In this way, an offering institution can maximize return with the least amount of effort. For example, loan products are offered with set terms, rates and payments. Thus, a consumer obtains a loan with the most applicable terms, and proceeds to make payments on the loan until the principle amount is satisfied. In many cases, the terms of the loan can be tailored within some limit, but often not sufficient to meet the needs of an individual consumer, and particularly not for low value loans.

Yet further, such loan products cannot be manipulated without accessing a representative for a particular institution. In some cases, institutions offer services, such as private banking, that provides access to a representative, and thus allows for some degree of flexibility in modifying existing financial products. However, such an approach is costly and is often only warranted for major customers. Indeed, institutions are often not willing to allow any access to representatives authorized to make adjustments to financial products because of the cost of providing such representatives. Thus, for this reason, manipulation of financial products is often not available to most consumers.

Hence, for at least the aforementioned reasons, there exists a need in the art for systems and methods capable of tailoring existing financial products to the needs of individual consumers. This, as well as a variety of other needs are addressed by the disclosure provided herein.

BRIEF SUMMARY OF THE INVENTION

Among other things, the present invention provides systems and methods for implementing one or a series of value transfers. In some instances, the systems and methods include web or Internet based user interfaces that provide a mechanism whereby a user can implement a transfer plan without interacting with a human operator. In other embodiments, such interfaces are provided via a telephone or interactive voice response (IVR) technology. In yet other embodiments, the interfaces are provided via a combination of telephone, Internet, and/or IVR technology. As such, various embodiments provide for customer service without involving a human operator. Further, in some instances, such systems and methods provide a mechanism for authorizing access to one or more asset accounts from which value is transferred, and/or recipient accounts to which value is transferred. In some cases, the authorization function is performed by an entity that enjoys a pre-existing relationship with a user accessing the systems of the present invention, while any actual transfers are performed by a third party entity. This can be an advantage where authorization requires a signature or other interaction with a user sufficient to conform to electronic signature laws.

In one embodiment of the present invention, a method for implementing an individualized financial plan is provided. The method includes receiving an authorization to access a first account, and providing a user interface that is operable to accept information about a second account. In some cases, the first account is an asset account and the second account is a recipient account. The information about the second account is received, and another user interface is presented that is operable to accept directions to perform recurring transfers from the first account to the second account. Such recurring transfers include a series of at least two transfers. Directions are received to perform the recurring transfers, and one of the series of transfers is initiated based at least in part on the previously received authorization. Subsequently, another of the series of transfers is performed based again on the authorization.

In some instances, the method further includes requesting a characteristic about the second account, which is then received. In various cases, the characteristic of the second account is selected from a group consisting of: a payment due date, a payment amount, a balance amount, and an early payment incentive. One or more transfers from the first account to the second account can be based at least in part on the characteristic of the second account. In some cases, the method further includes providing yet another interface that is operable to accept information about a user's pay period. Such information can be received and the various transfers aligned with the pay period.

Yet another interface can be provided in some cases to accept information to authorize use of an interim account. Such information related to the interim account can be received and access to the interim account authorized. From this point, one or more of the transfers can involve a transfer from the interim account to the recipient account, and subsequently another transfer from the asset account to the interim account. In various cases, the interim account is a revolving credit account, the asset account is selected from a group consisting of a bank account and a paycheck, and the second account is a loan account.

In some cases, the first account is selected from a group consisting of: a revolving credit account, a bank account, and a paycheck. Further, the second account can be selected from a group consisting of a revolving credit account and a loan account.

Another embodiment of the present invention provides methods for performing garnishments. Such methods include receiving a garnishment authorization that is associated with a paycheck. In addition, a user interface operable to accept information about an account is presented and information about the account is received. Another user interface is provided to accept directions to perform recurring transfers from the paycheck to the account. Such directions are received and one or more transfers from the paycheck to the account are performed.

Yet another embodiment of the present invention provides methods for collecting delinquent accounts. The methods include requesting authorization from an account owner to access an asset account associated with the account owner. In some cases, the account owner is liable for a delinquent account. The authorization to access the asset account is received and provided via a user interface. Another user interface operable to accept information about the delinquent account is accessed and the information about the delinquent account is provided via the interface. Yet another user interface operable to accept directions to perform a transfer from the asset account to the delinquent account is accessed and such directions are provided via the interface.

Yet a further embodiment provides methods for providing an individualized financial plan. The methods include authenticating a user whereby access to a first account associated with the user is authorized. The user is directed to a graphical interface in communication with a processor. The graphical interface is operable to receive information about a second account from the user, and to receive directions for performing a series of value transfers from the first account to the second account. Based at least in part on these directions, the processor initiates the series of value transfers.

Other embodiments provide systems for facilitating individualized financial services. The systems include a first self-service graphical interface operable to accept information about a first account, a second self-service graphical interface operable to accept information about a second account; and a third self-service graphical interface operable to accept directions to perform recurring transfers from the first account to the second account, wherein the recurring transfers include at least a first and a second transfer. In some cases, the systems further include a fourth self-service graphical interface operable to accept authentication information.

Such systems can also include a first processor in communication with the first, second, and fourth self-service graphical interfaces. The first processor receives the information about the first account, the information about the second account, and the authentication information. Further, the first processor is coupled to a first computer readable medium that includes instructions executable by the first processor to authorize access to the first account based at least in part on the authentication information. In addition, a second processor is in communication with the first processor and the third self-service graphical interface. The second processor receives at least a portion of the information about the first account, at least a portion of the information about the second account, and the directions to perform the recurring transfers from the first account to the second account. The second processor is coupled to a second computer readable medium that includes instructions executable by the second processor to initiate the recurring transfers. In some instances, the first processor is maintained by an entity that maintains the first account, such as a bank where the first account is a bank account. In other cases, the first processor is maintained by an entity that maintains the first account, and the second processor is maintained by an entity that maintains the second account. In such cases, the second account can be, for example, a loan. In yet other cases the first account is maintained by a first entity, the second account is maintained by a second entity, and the second processor is maintained by a third entity.

In various instances, the systems of the aforementioned embodiment further include a first processor maintained by a first entity and in communication with the first, and fourth self-service graphical interfaces. This processor receives the information about the first account, and the authentication information. Further, the processor is coupled to a first computer readable medium that includes instructions executable by the first processor to authorize access to the first account based at least in part on the authentication information. The systems further include another processor maintained by a second entity and in communication with the aforementioned processor, and the second and third self-service graphical interfaces. This other processor receives at least a portion of the information about the first account, the information about the second account, and the directions to perform the recurring transfers from the first account to the second account. Further, this other processor is coupled to a second computer readable medium that includes instructions executable by the second processor to initiate the recurring transfers.

In some cases, the first account is a bank account, and the second account is a loan. As an example, the first account can be a payroll account or paycheck of an employer of a user of the system. Alternatively, the first account can be a revolving credit account. As other examples, the second account can be a fixed term loan, a revolving credit account, or an investment account.

Another embodiment provides systems for facilitating individualized, self served financial services. Such systems include a computer readable medium that comprises instructions executable by a computer to: present a first user interface operable to accept information about a financial transaction associated with a first account; obtain a characteristic of the first account; and present a second user interface including the characteristic of the first account and operable to accept directions to perform a value transfer from a second account to the first account to at least partially satisfy the financial transaction.

In some cases, such systems further include another computer associated with another computer readable medium. The other computer readable medium includes instructions executable by a other computer to: present a third user interface operable to accept authentication information, wherein the authentication information includes an identification of the second account; authenticate a user based at least in part on the authentication information; and provide an indication of the authentication to the first computer.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 4 illustrates an exemplary interface for requesting authentication and/or payment information useful in relation to, among other things, the method of FIG. 3;

FIG. 6 illustrates an exemplary interface for confirming a requested transfer useful in relation, among other things, the method of FIG. 3;

DETAILED DESCRIPTION OF THE INVENTION

Figure 1:
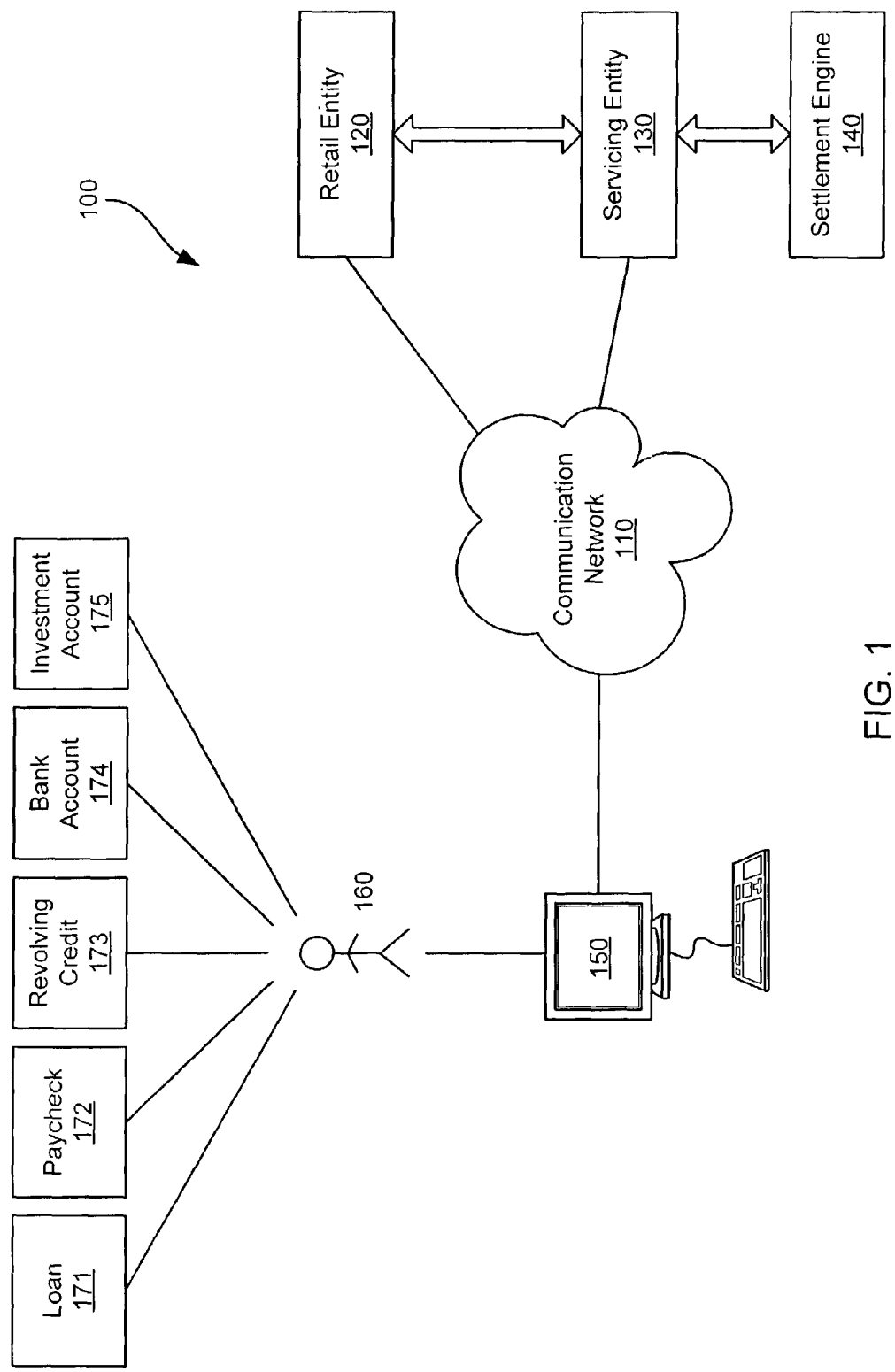
FIG. 1 illustrates a system in accordance with the present invention for providing access to an account and directing transfers from the account.

The present invention relates generally to the field of account customization, and in particular to systems and methods for tailoring account characteristics to the needs of an individual consumer. In some embodiments, a user interface is provided that allows an account owner to provide access to the account and effectuate a transfer to another account on a self-serve basis. In some cases, such a user interface is a web page or series of web pages that are accessible using the Internet. In various embodiments, authorization to access an account is provided via an authorization entity and the actual transfer request is provided via a transfer entity. In this way, a party with a more intimate relationship with the account owner can perform the authorization, while a party that specializes in the transfer aspect can perform the transfer. Thus, for example, the authorization party can be an account owner's local bank that is in a unique position to gather signatures or otherwise authorize account accesses. In contrast, the transferring entity can be set-up as a third party transfer system that offers little or no customer service at the account owner level.

In some embodiments, the transfers that are effectuated are recurring transfers directed at satisfying recurring obligations. Thus, the system can be tailored to effectuate a series of transfers. In some cases, the transfers are constant as with fixed rate loans, while in other cases the transfers are variable as with revolving credit lines. One of ordinary skill in the art will recognize other scenarios where the transfers are either variable or fixed. For example, the system may be configured to effectuate transfers of a recurring fixed amount to an investment account, while in other cases, the system may be tailored to effectuate variable transfers to an investment account to meet some future goal. A variety of scenarios are further discussed in U.S. Provisional Patent Application No. 60/423, 706, entitled "Systems and Methods for Directing Recurring Financial Transfer Operations"; U.S. Provisional Patent Application No. 60/423,708, entitled "Systems and Methods for Customizing Mortgage Characteristics"; and U.S. Provisional Patent Application No. 60/423,698, entitled "Systems and Methods for Authorizing Account Access", which were each previously incorporated herein by reference for all purposes.

Based on the disclosure provided herein, one of ordinary skill in the art will further appreciate the myriad of novel uses to which systems in accordance with the present invention can be applied. For example, such a system can be used by a collector to implement a catch-up plan for an account owner that has become delinquent on their obligations. Additionally, such systems can be used by consumers to effectuate an individualized financial plan without the need for a private banking relationship. Such a financial plan can include aligning the satisfaction of financial obligations with the reception of a paycheck from an employer, satisfying financial obligations just in time to generate as much interest income as possible, setting up a multi-tiered payment structure using payments from a series of accounts to maximize capital retention, and/or the like. Yet further, such systems can be used to effectuate garnishments either by a court or by an individual to whom the garnishments are directed. These and other novel uses of the systems of the present invention are further discussed below.

Turning to FIG. 1, a system 100 in accordance with the present invention is illustrated. System 100 includes a computer 150 in communication with a retail entity 120 and a service entity 130 via a communication network 110. Communication network 110 can be any communication network capable of providing communications between the various elements of system 100. In some embodiments, communication network 110 is the Internet providing message based communication between any of computer 150, retail entity 120 and servicing entity 130. In other embodiments, communication network 110 comprises a TCP/IP compliant virtual private network (VPN). In yet other embodiments, communication network 110 includes the Internet for communication between computer 150 and both of retail entity 120 and service entity 130, and a VPN between retail entity 120 and servicing entity 130. However, it should be recognized that other communication networks could be used to provide similar functionality. For example, communication network 110 can be a local area network (LAN), a wide area network (WAN), a telephone network, a cellular telephone network, a virtual private network (VPN), the Internet, an optical network, a wireless network, or any other similar communication network or combination thereof.

Computer 150 is accessible to an account owner 160 that is associated with one or more accounts 171-175. Such accounts can include, for example, a loan account 171, a paycheck account 172, a revolving credit account 173, a bank account 174, and/or an investment account 175. Loan accounts 171 can include fixed term, fixed rate, variable term, and/or variable rate obligations. Paycheck account 172 is an account that is associated with an employer of account owner 160 that includes an amount which the employer is obligated to provide to account owner 160 in exchange for the user's work. Other types of "paycheck" accounts can also be used. For example, an account can be an annuity that is fixed to pay account owner 160 a prescribed amount at a particular date. Revolving credit account 173 can be, for example, a credit card account, a home equity line of credit, or the like. Bank account 174 can be a checking account, a savings account, debit card account, or the like. Investment accounts 175 can be, for example, security brokerage accounts, money market accounts, mutual funds, or the like.

In general, a number of account types can be grouped as asset accounts or liability accounts. Asset accounts include cash or other value that can be transferred. In contrast, liability accounts include obligations that must be met. Thus, for example, asset accounts can include paycheck 171, bank account 174 and investment account 175. Liability accounts include loan account 171. Revolving credit account 173 can act as a hybrid asset/liability account capable of providing a source of funds, but also including obligations that must be met.

Retail entity 120 can be any entity that maintains some commercial relationship with account owner 160. Service entity 130, on the other hand, can be any entity that provides a service that is re-branded and offered by retail entity 120. Thus, for example, retail entity 120 can be a bank offering automatic bill payment products, and service entity 130 can be a third party that implements the products offered by retail entity 120, or portions thereof. This can be beneficial to allow retail entity 120 to exploit and/or extend its relationship with account owner 160, while allowing servicing entity 130 to focus on implementing the services offered.

In one particular embodiment the retail entity is a finance company that services automobile loans, and the servicing entity is a money transfer company such as Western Union™. Alternatively, in another embodiment, servicing entity 130 and retail entity 120 are the same entity that both implement the various services and maintains relationships with account owner 160. Servicing entity 130 either incorporates or is in communication with a settlement engine 140 that effectuates various value transfers. Settlement engine 140 can be, for example, a automatic clearing house for checks, and/or a credit card company as are known in the art.

Figure 2:
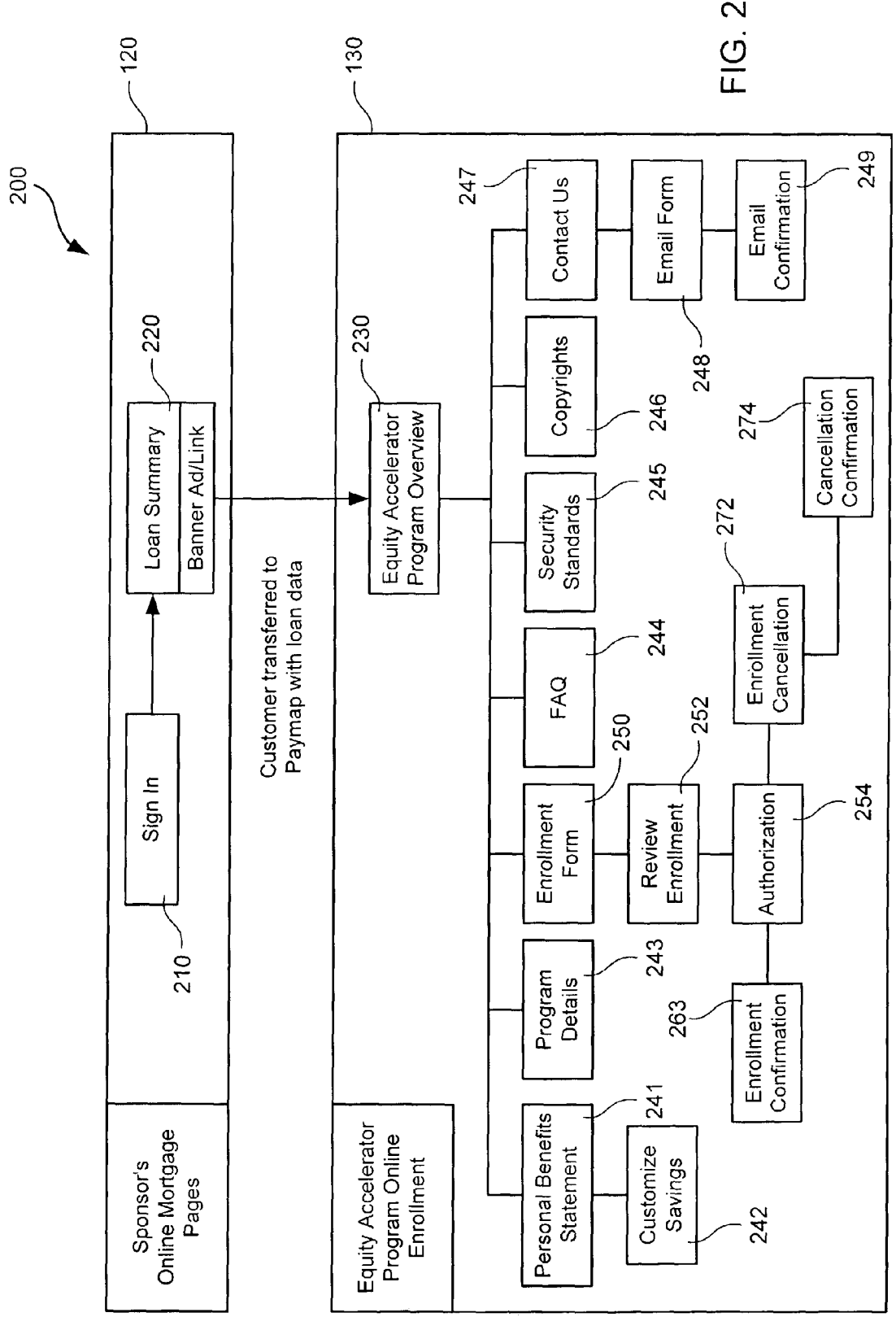
FIG. 2 illustrates a particular embodiment of the system of FIG. 1 that is tailored to implement mortgage acceleration programs.

Referring to FIG. 2, a system 200 for implementing payments using a graphical interface is illustrated. System 200 illustrates a division between retail entity 120 and servicing entity 130 in accordance with embodiments of the present invention. In the division, account owner 160 is authorized by retail entity 120. Further, account owner 160 identifies an account to which automatic payments will be applied. The account owner's identification and an identification of the account to which payments will be applied are provided to servicing entity 130.

As illustrated, the embodiment of system 200 includes a sponsor's online mortgage pages that include a sign in page 210 and a loan summary page 220. Sign-in page 210 includes data entry boxes for receiving authentication information about an account owner. This authentication information can include, but is not limited to, an account owner's name or other identifying number or name, and a security code or password. Once such information is provided via sign-in page 210, loan summary page 220 is presented to account owner 160. On this page, account owner 160 is presented with information about one or more accounts maintained by the sponsor. Account owner can select one or more of the accounts for which account owner 160 would like to set up automatic recurring payments. The indicated account(s) and the identification of account owner 160 are passed to servicing entity 130.

In this embodiment, servicing entity 130 provides a group of web pages that direct account owner 160 through a process of setting up an accelerated mortgage based on the mortgage account information passed from retail entity 120. The web pages include an overview page 230 that describes the offered equity accelerator program. From this page, account owner 160 can access informational pages 241, 242, 243, 244, 245, 246. These informational pages include information about the equity accelerator program being offered, and in the case of the custom savings page 242, offers information about other products available such as an automatic value transfer to a savings account.

In addition, various pages are presented to guide account owner 160 through the process of enrolling in the equity accelerator program. Such pages include an enrollment form page 250 that presents account owner 160 with a variety of data entry boxes to accept information about the user. Such information can include, but is not limited to, the account from which account owner 160 will transfer funds to the mortgage account identified in loan summary page 220. The account identification can include the account number and routing number sufficient to perform an ACH transfer as known in the art. Further, enrollment page 250 can include entry boxes for accepting information about the amount of any transfers, the date that transfers are to occur, the period of any transfers, the duration of any recurring transfer, the application of any transferred value, and/or the like. Upon providing the enrollment information, the enrollment information is presented to account owner 160 for their verification. Once account owner 160 has verified the information, account owner is presented with an authorization page 254. Authorization page 254 includes data entry boxes for receiving authorization information suitable to allow access to the account from which the value will be transferred to satisfy the selected loan account. Various authorization methods can be used in accordance with the present invention including those disclosed in U.S. Patent Application No. 60/423,698, entitled "Systems and Methods for Authorizing Account Access" that was previously incorporated herein by reference for all purposes.

Once the authorization is complete, account owner 160 is presented with a page that incorporates both a confirmation interface 262 and an enrollment cancellation interface 272. Account owner 160 selects between confirmation or cancellation. Where account owner 160 selects confirmation, the enrollment is complete and the defined value transfers from the bank account to the mortgage account are performed. Alternatively, where cancellation is selected, a cancellation confirmation page 274 is provided to account owner 160 to allow them to confirm the cancellation.

While the preceding embodiment was described in relation to transfers from a bank account to a mortgage account, the present invention provides for performing such transfers from any number of asset accounts to any number of asset and/or liability accounts. Thus, based on the disclosure provided herein, one of ordinary skill in the art will recognize that the transfers can be performed from paycheck account 172, revolving credit account 173, bank account 174 and/or investment account 175 to loan account 171, revolving credit account 173, bank account 174 and/or investment account 175.

Figure 3:
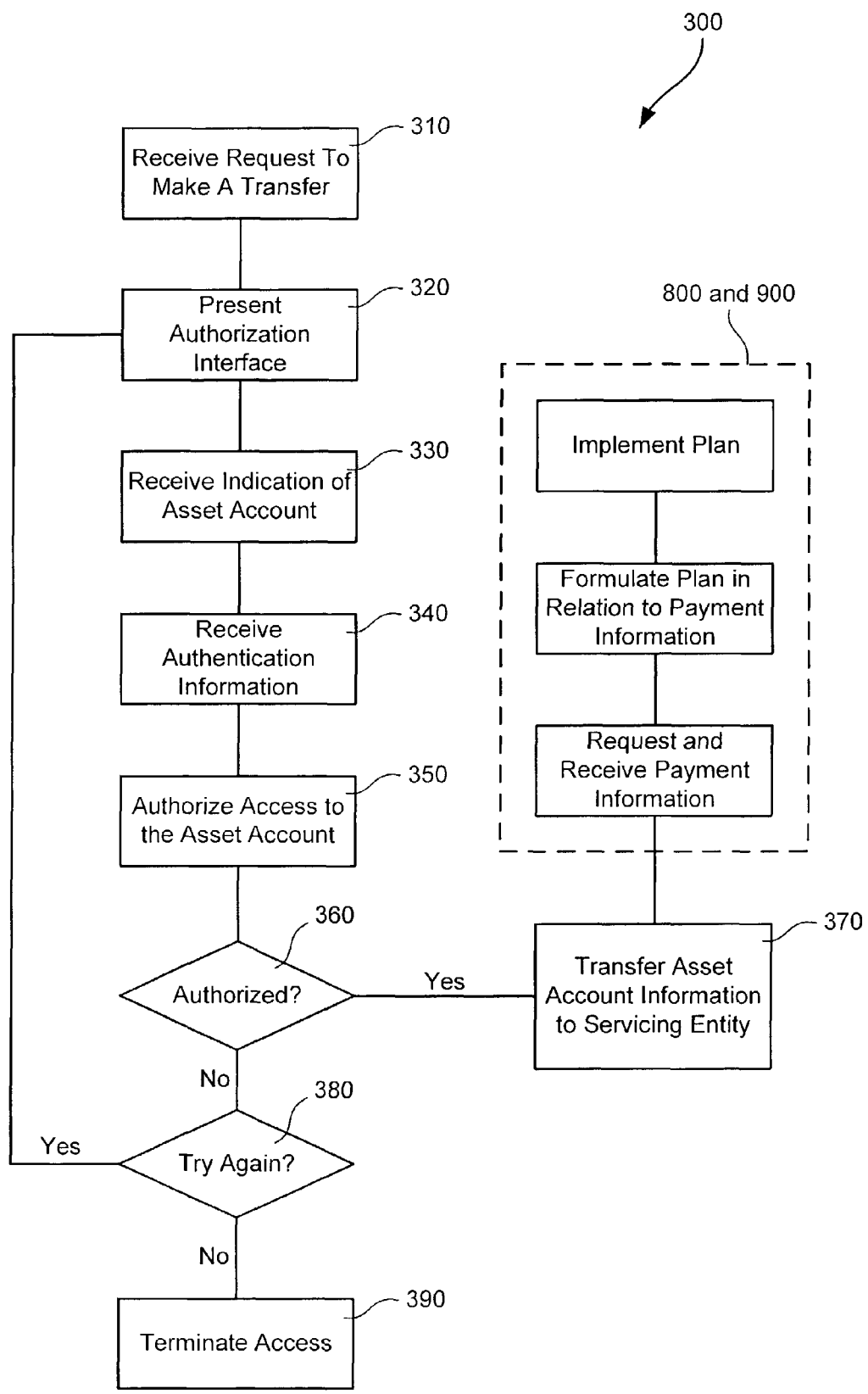
FIG. 3 is a flow diagram illustrating one method in accordance with the present invention for gaining access to an account and performing transfers therefrom.

Turning to FIG. 3, a flow diagram 300 illustrates one embodiment of a process for implementing a transfer in accordance with the present invention. Following flow diagram 300, a request to make a transfer is received (block 310). In some cases, such a request is received via a web page accessible to account owner 160. In some cases, the web page is presented by retail entity 120 that enjoys a pre-existing relationship with account owner 160, while in other cases, the web page is presented by servicing entity 130. An authorization interface, which in some instances is a web page or portion thereof, is presented (block 320). One embodiment of such an authorization interface 400 is presented in FIG. 4.

Referring to FIG. 4, authorization interface 400 includes data entry boxes 410, 420, 450, 460, 470, 480 for receiving the name and address information of account owner 160, a data entry box 440 for receiving a transfer or payment amount, a data entry box 430 for providing an account number, and a group of one or more data entry boxes 491, 492, 493 for receiving dates upon which future transfers are to occur. In addition, a more link 494 is available where more than three transfer dates are to be entered. Interface 400 thus provides a mechanism for receiving authorization information and transfer information.

Returning to FIG. 3, an indication of the asset account from which the transferred funds will be derived is received (block 330). Such an indication can be, for example, an account number provided via data entry box 430. Alternative approaches can include receiving the name of the account from which the account identification number can be derived. For example, the indication of the asset account can be "Joe's Checking Account". "Joe's Checking Account" can be a proxy which is compared to a proxy list on computer 150 to derive the actual account number, or can be compared to a proxy list maintained by either retail entity 120 or servicing entity 130 from which the actual account identification number is derived.

Further, authorization information is received (block 340). Such authorization information can include the name of account owner 160 and a security code that together act as an electronic signature authorizing access to the previously received access account. Based on this authorization information, account holder 160 is authenticated and authorized to implement a plan whereby funds may be transferred to/from the designated asset account (block 350). Of course, based on the disclosure provided herein, one of ordinary skill in the art will recognize other authorization information and/or authorization process that can be used in relation to the present invention to authorize access to the asset account.

Where the authorization fails (block 360), an interface is presented asking if another attempt is desired (block 380). Where another attempt is desired, the interface requesting authorization information is re-presented and the processes associated with block 320 through 360 are repeated. Where another attempt is not desired (block 380), the communication is terminated (block 390).

Alternatively, where the authorization is successful (block 360), the asset account information and the authorization is transferred from the authorizing entity to the entity that will ultimately implement the transfers (block 370). In some instances, the authorizing entity is retail entity 120, while in other instances the authorizing entity is servicing entity 130. With the transferred information, a request for payment information can be presented and the information received; a transfer plan can be formulated in relation to the payment information; and the plan can be implemented by servicing entity 130 (block 800 and 900 discussed in more detail below).

Figure 5:
FIG. 5 illustrates an exemplary interface for requesting account information useful in relation to, among other things, the method of FIG. 3.

FIGS. 5 and 6 provide exemplary embodiments of interfaces for providing account information and payment information. Turning to FIG. 5, an interface 500 provides for accepting an ABA routing number 520, a bank account number 530 and a check number 540 from which a payment is derived. Further, interface 500 provides for entering an account type 510 and a payment amount 550. In addition, interface 500 includes a previously indicated account 570 to which the transfer will be directed, and the date(s) 560 on which the transfer will occur, as will as the identification information 580 for account owner 160. After this information is provided and accepted, interface 600 depicted in FIG. 6 can be presented. Referring to FIG. 6, a graphic 610 appearing as a check is provided as part of interface 600 to aid account owner 160 in confirming the transfer.

Figure 7:
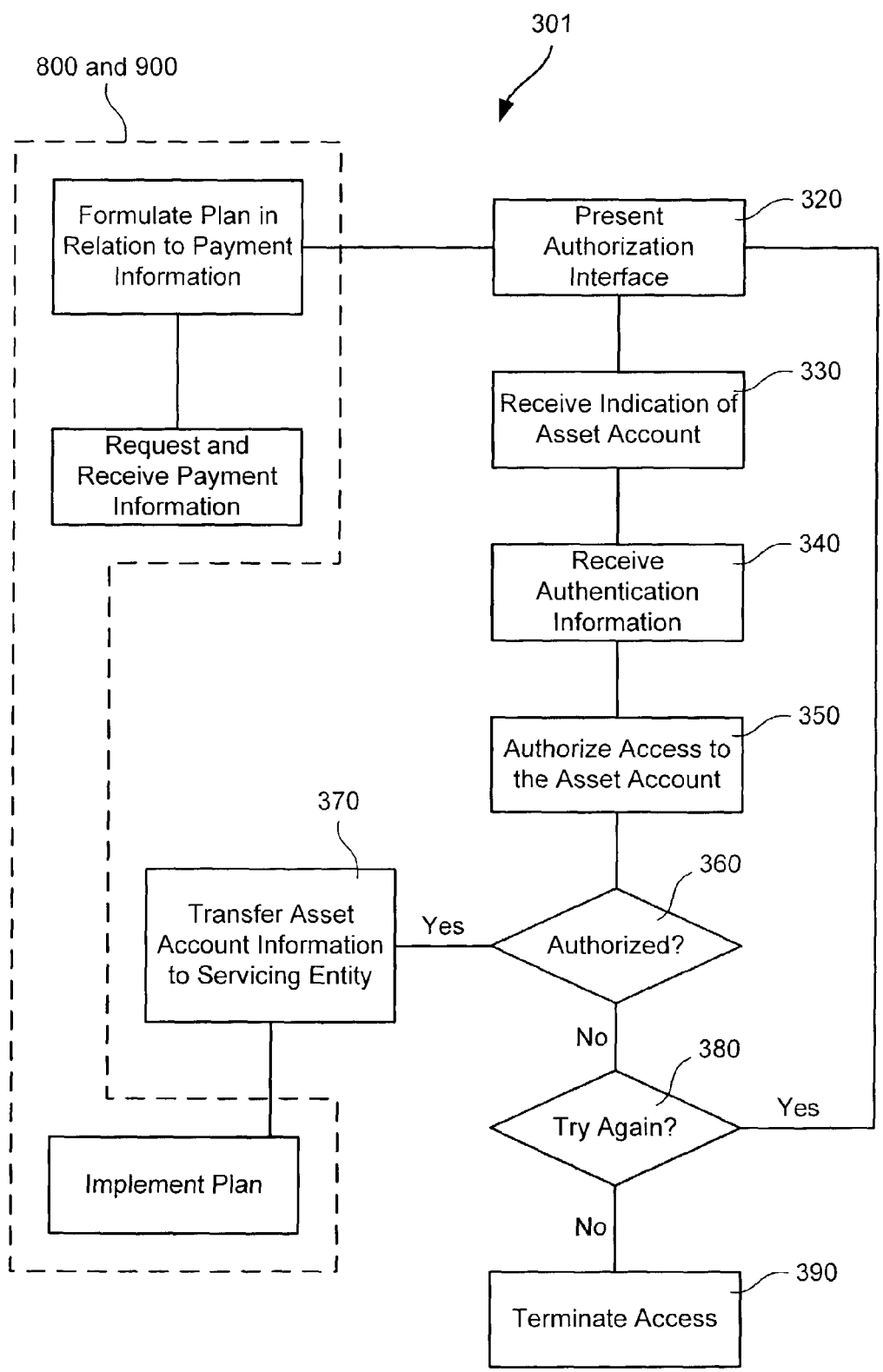
FIG. 7 is a flow diagram illustrating another method in accordance with the present invention for gaining access to an account and performing transfers therefrom.

Turning to FIG. 7, a flow diagram 301 illustrates another embodiment of a process for implementing a transfer in accordance with the present invention. Following flow diagram 301, an interface requesting information about an account to which money is to be paid is presented, the requested information is received, and a transfer plan can be formulated by servicing entity 130 (block 800 and 900 discussed in more detail below). With the plan formulated, an interface or series of interfaces can be presented whereby account owner 160 is authenticated and authorized to access an asset account from which funds will be transferred to make a payment. After the series of interfaces are presented and the information received as requested, the formulated plan is implemented (block 800 and 900 discussed in more detail below).

As depicted on flow diagram 301, the aforementioned interfaces include presenting an authorization interface (block 320), receiving an indication of the asset account from which the transferred funds will be derived (block 330), receiving authorization information (block 340), and authorizing access to the indicated asset account (block 350). Where the authorization fails (block 360), an interface is presented asking if another attempt is desired (block 380). Where another attempt is desired, the interface requesting authorization information is re-presented and the processes associated with block 320 through 360 are repeated. Where another attempt is not desired (block 380), the communication is terminated (block 390). Alternatively, where the authorization is successful (block 360), the asset account information and the authorization is transferred from the authorizing entity to the entity that will ultimately implement the transfers (block 370).

Figure 8:
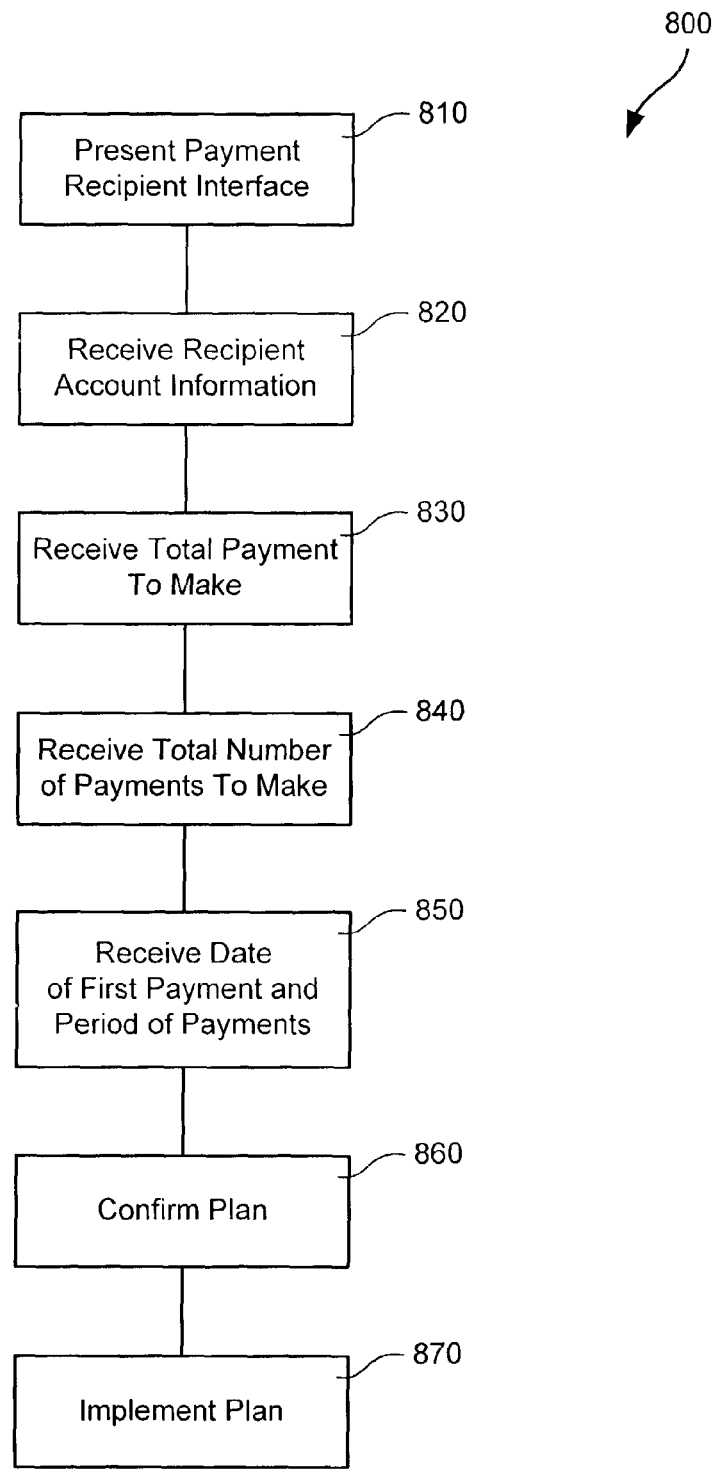
FIG. 8 is a flow diagram illustrating one method in accordance with the present invention for performing the payment set-up and transfer generalized in FIGS. 3 and 6.

Turning to FIG. 8, the previously referenced block 800 is described in more detail. More particularly, block 800 is represented as flow diagram 800 illustrating a method for obtaining information about an account to which value is to be transferred in accordance with an embodiment of the present invention. Following flow diagram 800, a payment recipient interface is presented (block 810). In some cases, this payment recipient interface is a web page, or portion thereof where account owner or other user can designate a recipient of a payment. Thus, for example, a mortgage, car loan, investment account, revolving credit account, home equity credit line, and/or the like can be designated. Such designation can include providing information about the account that is sufficient to perform an ACH transfer in accordance with NACHA rules. Thus, recipient account information is received (block 820), along with an amount to be transferred (block 830) and the number of times to perform the transfer (block 850). In addition, the date of the first transfer is provided along with a period between the transfers, or a series of dates upon which to perform the transfers where more than one transfer is to be accomplished (block 850). The plan is then presented via an interface that includes a mechanism for confirming the plan (block 860). With the plan confirmed, it is implemented by performing the one or more transfers as provided in the plan.

Figure 9:
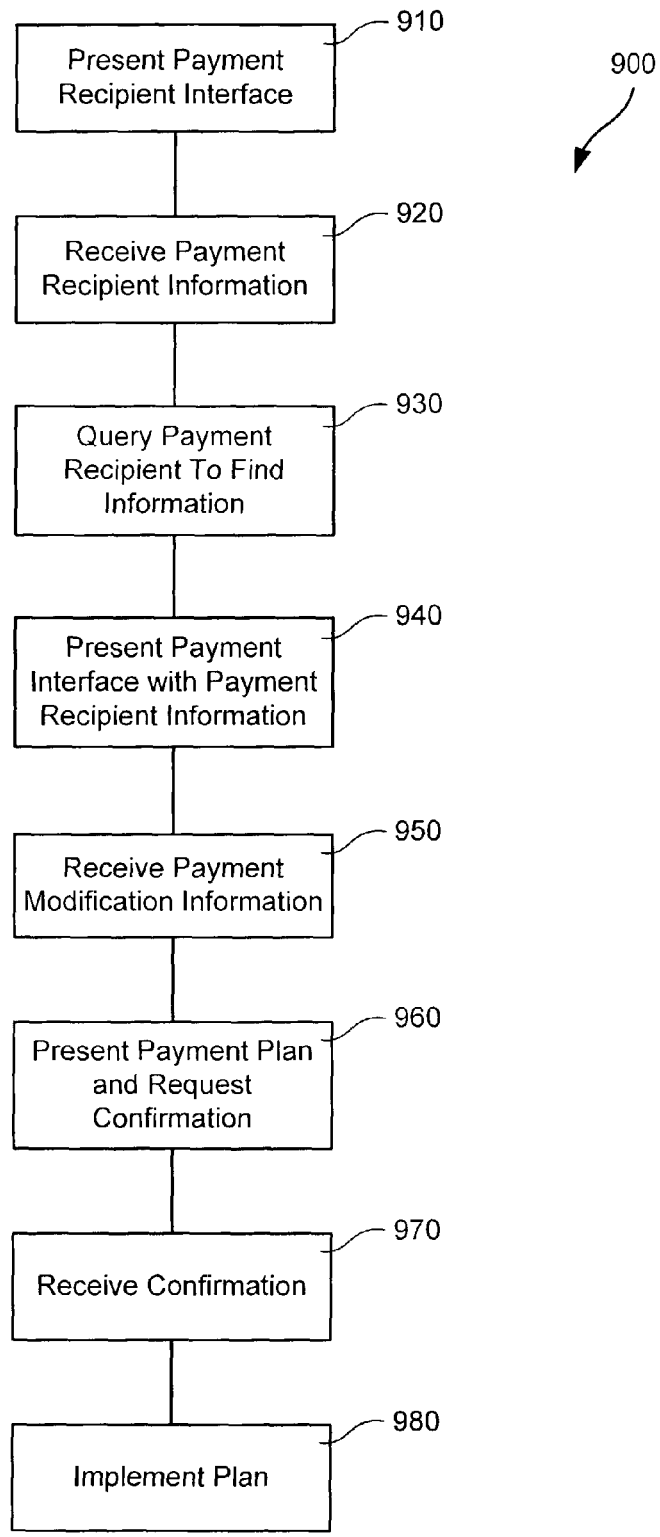
FIG. 9 is a flow diagram illustrating another method in accordance with the present invention for performing the payment set-up and transfer generalized in FIGS. 3 and 6.

Turning to FIG. 9, the previously referenced block 900 is described in more detail. More particularly, block 900 is represented as flow diagram 900 illustrating another method for obtaining information about an account to which value is to be transferred in accordance with embodiments of the present invention. Following flow diagram 900, a payment recipient interface is presented (block 910). In accordance with the payment recipient interface, recipient account information is received (block 920). The recipient account is then accessed and queried to determine account parameters associated with the recipient account (block 930). Thus, for example, payment due dates, minimum payment amounts, mortgage and principal breakdowns, interest rates, period of payment due dates, returns on investment, and/or the like can be gathered. The gathered information is then presented to account owner 160 for consideration (block 940). Based on this information, modifications to payments can be indicated (block 950). These modifications, and any effects thereof, can then be presented via an interface that includes a request to confirm the modifications (block 960). Once the confirmation is received (block 970), a transfer plan the effectuates the modifications can be implemented (block 980).

Figure 10:
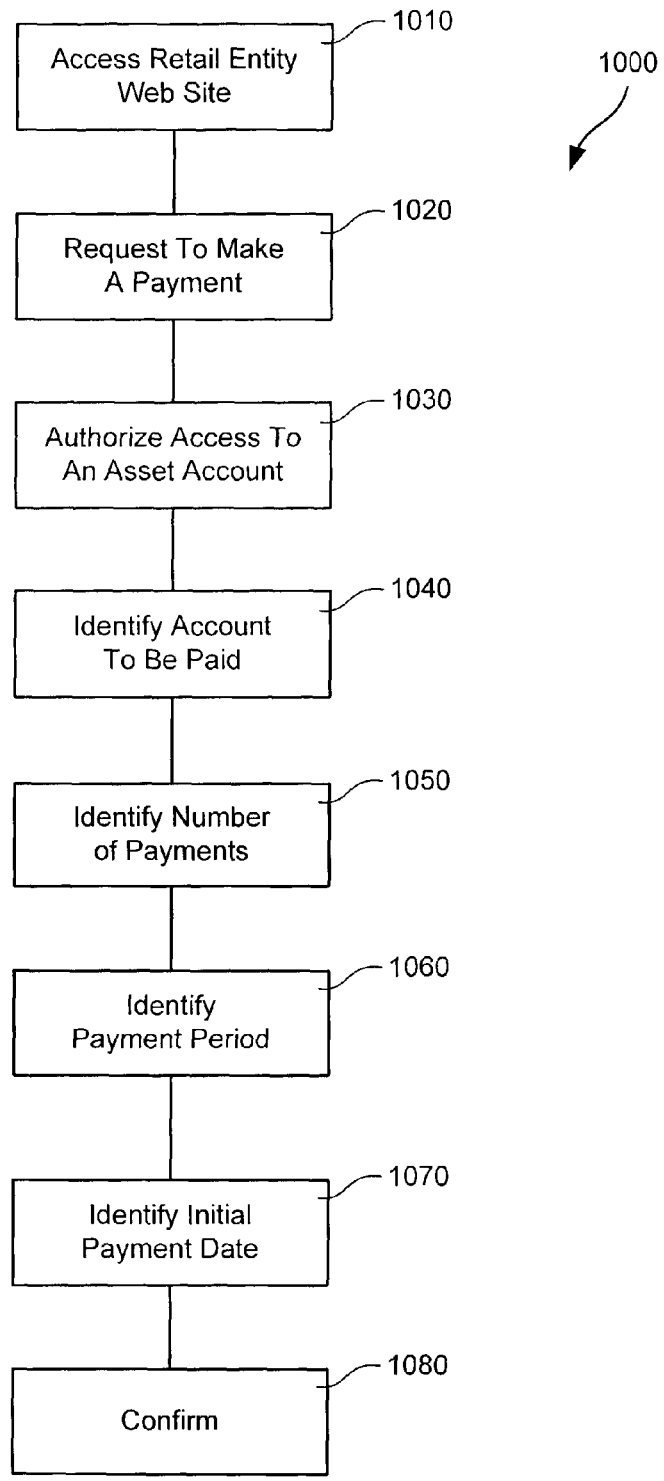
FIG. 10 is a flow diagram illustrating another embodiment of the present invention where a consumer interacts with systems of the present invention to effectuate a transfer.
Figure 11:
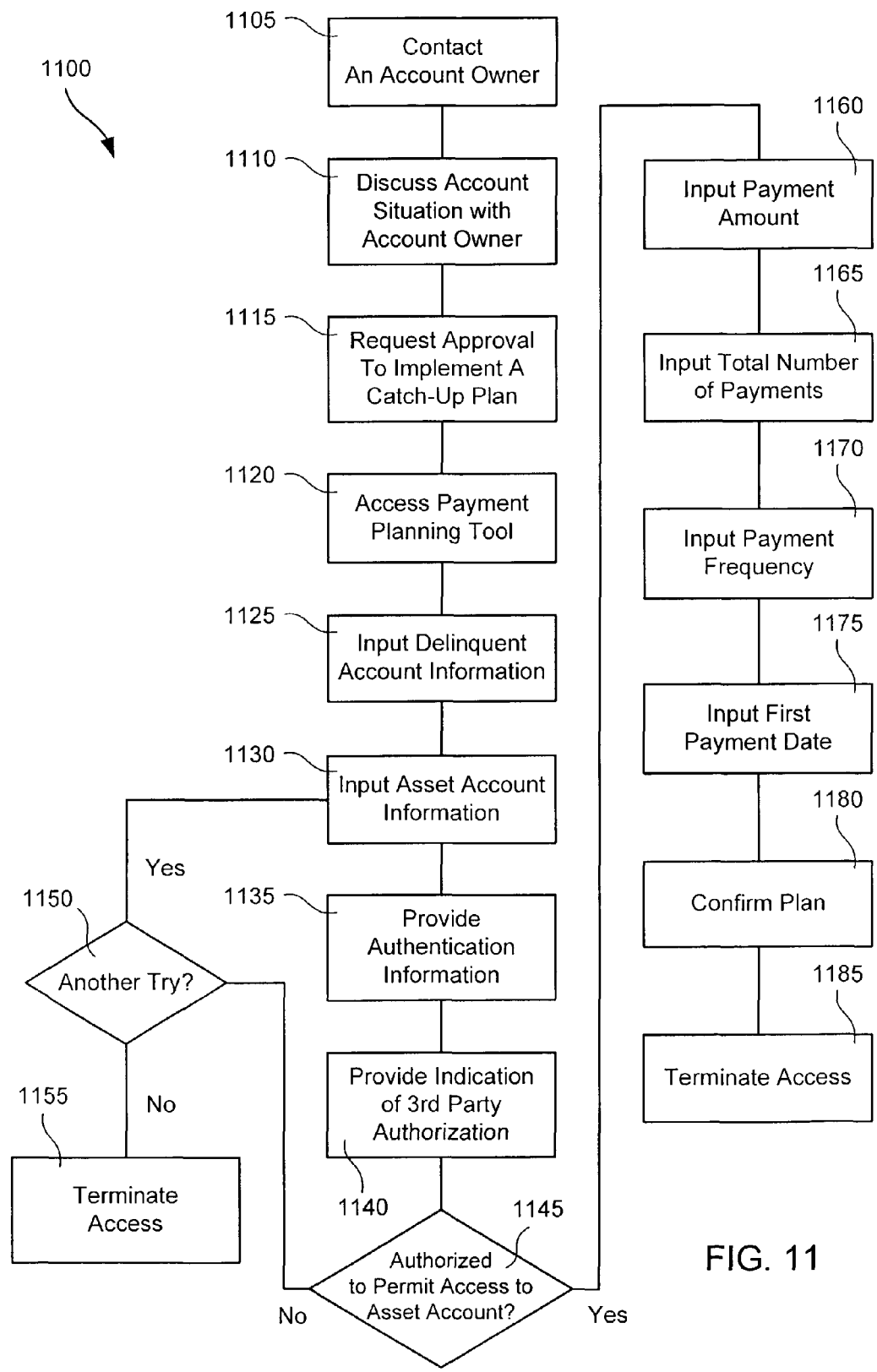
FIG. 11 is a flow diagram illustrating yet another embodiment of the present invention where a collector interacts with systems of the present invention to effectuate a transfer.
Figure 12:
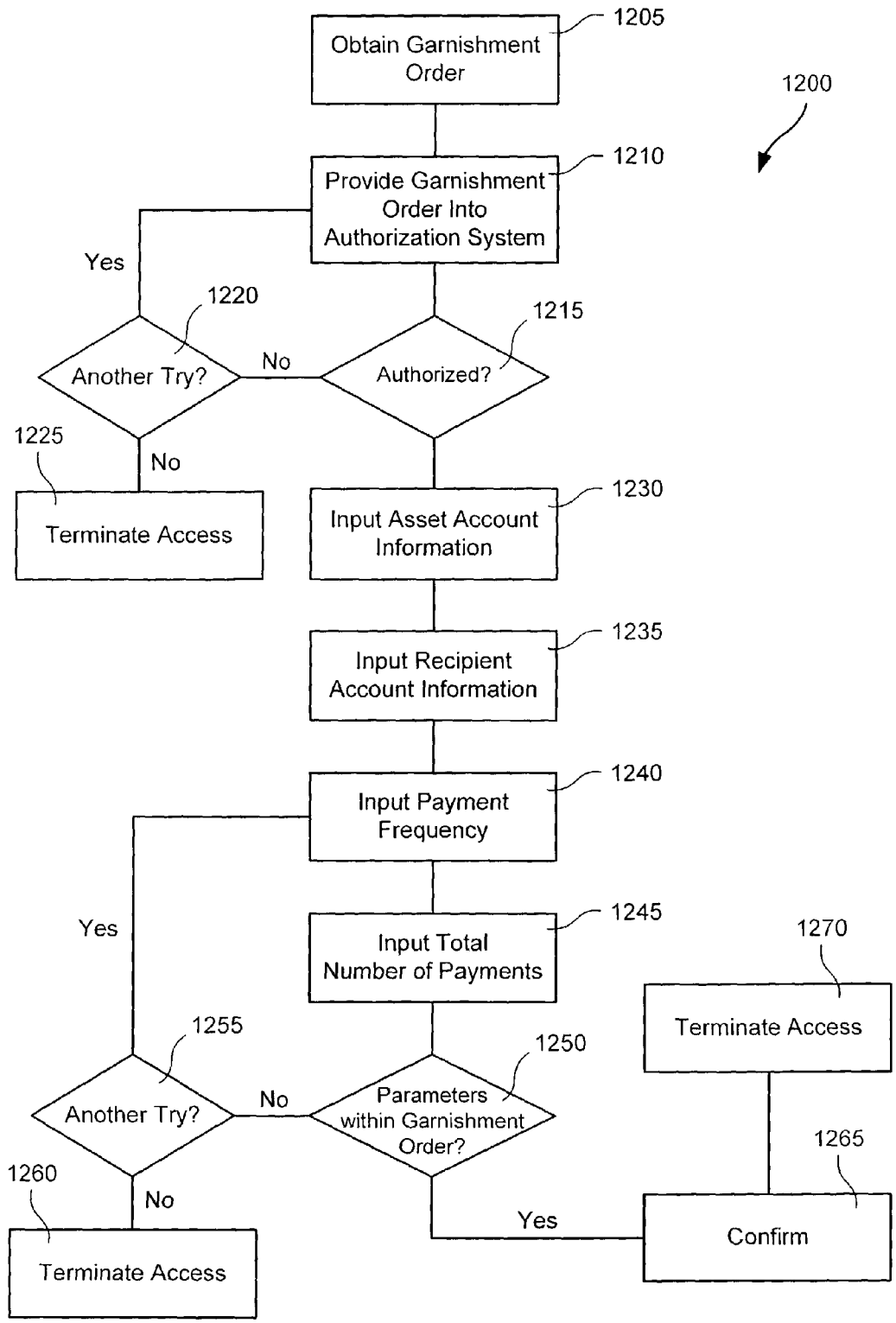
FIG. 12 is a flow diagram illustrating an additional embodiment of the present invention where a person with a garnishment order can effectuate the garnishment using systems of the present invention.

FIGS. 10-12 provide flow diagrams 1000, 1100, 1200 depicting three distinct uses for the aforementioned systems and methods that are in accord with the present invention. Based upon the discussion of the three uses, one of ordinary skill in the art will recognize a variety of other uses that can also be practiced in accordance with the present invention. Turning to FIG. 10, flow diagram 1000 illustrates a method for using the aforementioned systems for convenience in setting up a series of one or more transfers from one account to another. Following flow diagram 1000, account owner 160 access a web site maintained by retail entity 120 (block 1010). Such a site can be, for example, maintained by a bank that handles an account from which funds will be transferred, or the like. Via the accessed web site, account owner 160 makes a request to perform a transfer (block 1020). This request can include an identification of the asset account from which the transfer will occur and authentication information about account owner 160. This information is utilized by retail entity 120 to authorize access to the designated asset account (block 1030). In addition, account owner 160 identifies an account to which a payment will be transferred (block 1040). In some instances, this is done via a web page that is served by retail entity 120, while in other cases, this is done via a web page that is served by servicing entity 130. Further, account owner 160 designates the total number of transfers to be performed (block 1050), the period between each of the transfers (block 1060), and the initial payment date (block 1070). In some cases, the period of the transfer can correspond to a pay period of an employer. Thus, a withdrawal from bank account 174 can coincide with a deposited paycheck. In certain circumstances, the asset account from which the funds are derived can be the paycheck of account owner 160. Thus, the funds from the paycheck are transferred at each pay period to satisfy one or more obligations or goals of account owner 160. The various parameters provided by account owner 160 can then be presented to account owner 160 and confirmed (block 1080).

Turning to FIG. 11, flow diagram 1100 illustrates a use in accordance with embodiments of the present invention whereby a bill collector can implement a catch-up program for a delinquent account owner. Following flow diagram 1100, the bill collector contacts the delinquent account owner (block 1105). In some cases, this is done over a telephone and the bill collector enters relevant information about the delinquent account owner via an web page interface. The bill collector discusses the delinquency with the account owner (block 1110) much as a bill collector would act to persuade a delinquent account owner to pay. Upon receiving an agreement to pay, the bill collector requests approval to implement a catch-up plan to bring the account owner current in their obligations (block 1115).

The bill collector accesses a payment planning tool in accordance with the present invention (block 1120). The bill collector then enters information about the delinquent account including account numbers and routing numbers (block 1125). In addition, the bill collector inputs information about an asset account from which funds will be transferred to the delinquent account (block 1130). This information can be gathered from the delinquent account owner while they are on the telephone with the bill collector, and in some cases can include the paycheck, bank account, revolving credit account, or the like of the delinquent account owner. Further, the bill collector provides authentication information such as the name and social security number of the delinquent account owner (block 1135). This authentication information can also be gathered from the delinquent account owner while they are on the telephone with the bill collector. An indication that the information is being provided by a third party bill collector can be provided to assure that the authentication and authorization process is performed in light of a third party authentication (block 1140).

The authentication information is then used to determined if an authorization can be granted (block 1145). If the authorization fails, it can be determined if the bill collector would like to try again with different information (block 1150). If another try is desired, the processes of blocks 1130-1145 are repeated. Alternatively, if another try is not desired, access to the payment system is terminated (block 1155).

Where the authorization is accepted, the bill collector is presented with an web page interface where they can enter an amount to be transferred from the asset account to the delinquent account (block 1160). Further, the total number of transfers are indicated (block 1165), as well as the frequency of transfers (block 1170) and the date of the initial transfer (block 1175). A web page is then presented to confirm the payment plan (block 1180), and upon confirmation access to the payment system is terminated.

Turning now to FIG. 12, flow diagram 1200 illustrates a use in accordance with embodiments of the present invention whereby a court or other party with a garnishment order can effectuate the garnishment. Following flow diagram 1200, a garnishment order is obtained (block 1205) and the characteristics of the garnishment order including order number, amount and frequency are provided into an authorization system (block 1210) via a web page authorization interface by someone desiring to effectuate the garnishment order. It is then determined if the garnishment order is authorized to be implemented via the system (block 1215). If the garnishment order is not found, or not authorized, it is determined if another try to enter the garnishment information is desired (block 1220). If desired, the processes of blocks 1210 and 1215 are repeated, otherwise, access to the system is terminated (block 1225).

Where the garnishment order is found and is authorized (block 1215), an asset account from which the garnishment order is to be satisfied is indicated (block 1230). In most circumstances, this is a paycheck as it represents a consistent source from which to satisfy the garnishment order. In addition, a recipient account is designated (block 1235). The recipient account is typically the account of the party favored by the garnishment. Or, in some cases, it can be a general account maintained by, for example, a court to which the party favored by the garnishment can withdraw funds. In addition, the transfer frequency can be entered (block 1240), as well as the total number of transfers (block 1245). In one embodiment, the total number of transfers is indefinite and is only limited by a change in one or more of the accounts, or a modification of the garnishment order.

It is then determined if the entered parameters are in line with the garnishment order (block 1250). If not, it is determined if the user desires to modify the entered parameters (block 1255). Where it is desired to modify the parameters, the processes of blocks 1240 through 1250 are repeated. If not, access to the system is terminated (block 1260). Where the entered parameters coincide with the garnishment order (block 1250), a web page with the transfer plan is presented to the user and confirmed (block 1265). Finally, access to the system is terminated (block 1270) and servicing entity 130 proceeds to implement the transfer plan.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for implementing a catch-up program with a delinquent account owner, the method comprising:
   collecting, by a web page interface, information from the delinquent account owner regarding:
      an asset account, wherein the asset account comprises a selection from a group consisting of: a paycheck, a bank account, and a revolving credit account; and
      authentication information, wherein the authentication information authenticates that the delinquent account owner authorizes access to the asset account for making at least one payment to a delinquent account;
   accessing, by the web page interface, a payment planning system;
   providing, from the web page interface, information regarding the delinquent account and the asset account to the payment planning system, the information including:
      an account number of the delinquent account;
      information regarding the asset account;
      the authentication information; and
      an indication that at least one of the account number of the delinquent account, the information regarding the asset account, or the authentication information was or was not provided by a third party bill collector;
   accessing by the web page interface the asset account using the authentication information
      providing, from the web page interface to the payment planning system, information regarding an amount to be transferred from the asset account to the delinquent account, a total number of transfers, a frequency of transfers, and a date of an initial transfer; and
      receiving, at the web page interface, from the payment planning system a conformation of an initiation of a catch-up program.

2. The method of claim 1, further comprising:
   for at least one of the total number of transfers, initiating, with the payment planning system, a first transfer from a first account to an interim account, and a second transfer from the interim account to a second account.

3. The method of claim 1, wherein collecting information from the delinquent account owner comprises inputting information into an interface.

4. The method of claim 3, wherein inputting information into an interface comprises prepopulating the interface with new information and information previously received.

5. The method of claim 1, wherein:
   a first processor conducts at least a portion of one of the following steps:
      collecting information;
      receiving an agreement to pay the delinquent account;
      receiving approval from the delinquent account owner to implement the catch-up program;
      accessing a payment planning system; and
      provide information regarding the delinquent account and the asset account to the payment planning system; and
   a second processor conducts at least a portion of one of the following steps:
      attempt to access the asset account using the authentication information;
      providing information regarding an amount to be transferred from the asset account to the delinquent account, a total number of transfers, a frequency of transfers, and a date of an initial transfer; and
      confirming initiation of the catch-up program.

6. The method of claim 5, wherein the first processor is maintained by an entity that maintains the asset account.

7. The method of claim 5, wherein the second processor is maintained by an entity that maintains the delinquent account.

8. The method of claim 5, wherein the first processor or the second processor is maintained by a third party service provider which does not maintain the asset account or the delinquent account.

9. The method of claim 1, wherein the asset account is a bank account.

10. The method of claim 1, wherein the delinquent account is a loan account.

11. A non-transitory storage medium, storing executable instructions that when executed by a processor causes the processor to perform the steps of:
    collecting, by a web page interface, information from the delinquent account owner regarding:
       an asset account, wherein the asset account comprises a selection from a group consisting of: a paycheck, a bank account, and a revolving credit account; and
       authentication information, wherein the authentication information authenticates that the delinquent account owner authorizes access to the asset account for making at least one payment to a delinquent account;
    accessing, by the web page interface, a payment planning system;
    providing, from the web page interface, information regarding the delinquent account and the asset account to the payment planning system, the information including:
       an account number of the delinquent account;
       information regarding the asset account;
       the authentication information; and
       an indication that at least one of the account number of the delinquent account, the information regarding the asset account, or the authentication information was or was not provided by a third party bill collector;
    accessing by the web page interface the asset account using the authentication information
       providing, from the web page interface to the payment planning system, information regarding an amount to be transferred from the asset account to the delinquent account, a total number of transfers, a frequency of transfers, and a date of an initial transfer; and receiving, at the web page interface, from the payment planning system a conformation of an initiation of a catch-up program.

12. The non-transitory storage medium of claim 11, wherein the processor-executable instructions further comprise instructions for:

for at least one of the total number of transfers, initiating a first transfer from a first account to an interim account, and a second transfer from the interim account to a second account.

13. The non-transitory storage medium of claim 11, wherein the storage medium is maintained by a third party service provider which does not maintain the asset account or the delinquent account.

14. The non-transitory storage medium of claim 11, wherein the asset account is a bank account.

15. The non-transitory storage medium of claim 11, wherein the delinquent account is a loan account.

16. A system for implementing a catch-up program with a delinquent account owner, the system comprising:

a servicing entity subsystem comprising a processor and a memory storing executable instructions that when executed by the processor causes the processor to perform the steps of:

collecting, by a web page interface, information from the delinquent account owner regarding:

an asset account, wherein the asset account comprises a selection from a group consisting of: a paycheck, a bank account, and a revolving credit account; and authentication information, wherein the authentication information authenticates that the delinquent account owner authorizes access to the asset account for making at least one payment to a delinquent account;

accessing, by the web page interface, a payment planning system;

providing, from the web page interface, information regarding the delinquent account and the asset account to the payment planning system, the information including:

an account number of the delinquent account;

information regarding the asset account;

the authentication information; and an indication that at least one of the account number of the delinquent account, the information regarding the asset account, or the authentication information was or was not provided by a third party bill collector;

accessing by the web page interface the asset account using the authentication information providing, from the web page interface to the payment planning system, information regarding an amount to be transferred from the asset account to the delinquent account, a total number of transfers, a frequency of transfers, and a date of an initial transfer; and receiving, at the web page interface, from the payment planning system a conformation of an initiation of a catch-up program.

17. The system of claim 16, wherein the servicing entity subsystem is configured to:

for at least one of the total number of transfers, initiating a first transfer from a first account to an interim account, and a second transfer from the interim account to a second account.

18. The system of claim 16, wherein the servicing entity subsystem is maintained by a third party service provider which does not maintain the asset account or the delinquent account.

19. The non-transitory storage medium of claim 16, wherein the asset account is a bank account.

20. The non-transitory storage medium of claim 16, wherein the delinquent account is a loan account.

* * * * *